Patented Sept. 5, 1944

2,357,346

UNITED STATES PATENT OFFICE 2,357,346

PREPARATION OF COMPOUNDS FOR LUBRICANTS, ETC.

John M. Musselman, South Euclid, and Herman P. Lankelma, Shaker Heights, Ohio, assignors to The Standard Oil Company, Cleveland, Ohio, a corporation of Ohio No Drawing. Application July 18, 1940, Serial No. 346,218

20 Claims. (Cl. 252—45)

Various sulphur compounds have been employed in lubricants, and to a lesser extent various phosphorus compounds. The handicap however has been the tendency to corrode metals, and particularly the soft metal bearings of the type in prevalent use. We have now found however that corrosion difficulties may be avoided by certain procedure on the materials as more particularly detailed hereinafter. Practical convenience of manufacture is also at the same time had.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In its general aspects, the invention involves the reaction products of waxes, i. e., esters of higher monohydric alcohols (sterols) and fatty acids, as effected by a sulphide of phosphorus, as $P_2S_5$, $P_4S_3$, etc. With particular advantage $P_2S_5$ is employed, as it is found that this yields clean products having desirable qualities without sulphur or phosphorus contaminants and which avoid an active phosphorus content, thus being unique in the face of the fact that phosphorus is employed as a reaction component (but without contamination). Illustrative waxes are wool wax or wool grease, degras, lanolin, beeswax, sperm oil, carnauba wax, Japan wax, Chinese wax, spermaceti, etc.

For reaction, the wax is heated with the sulphide of phosphorus to such a temperature that reaction occurs and is continued until the spontaneous reaction which sets in, subsides. Considerable heat is disengaged, the reaction being exothermic, and in operation the reaction mixture is first heated to about 275–300° F., and the temperature is maintained to the desired result or until the spontaneous reaction completes itself. Generally, a reaction time of an hour or slightly more or slightly less, is desirable. The amount of phosphorus sulphide used depends on the molecular weight of the wax; 1 mol of $P_2S_5$ sufficing for 1½ mols of wax. For instance in preparation of the reaction product of wool wax and phosphorus pentasulphide, about 30 per cent of $P_2S_5$ is desirable. This is in slight excess of the theoretical quantity, but such excess is advantageous in establishing reaction driving conditions and forcing the reaction to completion. Finally the excess can be readily eliminated. The mixture resulting from reaction consists of the reaction product, oxides of phosphorus, and other insoluble matters of sludge-like character. The insoluble materials are removed, as by centrifuging or filtering, and the reaction product appears as a clear material free from oxides of phosphorus and other sludge-like matter. The removal of these insoluble materials is very essential to the quality of the product.

The reaction products of wax and phosphorus sulphide are quite superior to reaction products of phosphorus sulphide on fatty oils (compounds of fatty acids and glycerin). Reaction products of fatty oils such as lard oil and phosphorus sulphide, thus are prone to exert some corrosive action in lubricants, and are undesirable. The reaction products according to the present invention however are far more stable than the reaction products of fats, and under conditions of high temperature stand up far better, and avoid corrosive action on copper and other bearing metals so prone to occur with known reaction products heretofore. And, a reason for this can be seen in the fact that phosphorus and contaminating sulphur are easily removable, and a clean stable reaction product may be had, without the disadvantages of phosphorus or sulphur.

The quantity of reaction product used may vary, depending upon the particular service to which it is applied. In grease usages, the amount may be 5 to 100 per cent, as desired or necessary in view of the particular type of service to which the grease is put. The reaction products having particular utility also as extreme pressure lubricants, for E. P. oils as for lubricating hypoid type gears, 5 to 25 per cent of the reaction product may be employed in the oil. For improving the stability of mineral oil lubricants for internal combustion engines, 0.5 to 3 per cent is sufficient. For Diesel engines, to prevent ring sticking, this percentage may be increased. And, in general, the amount of the reaction product used may vary from 0.01 to 25 to 100 per cent, depending upon the particular usage.

As an example: 100 pounds of degras and 30 pounds of $P_2S_5$ are heated to 275° F. for one hour, with constant agitation. After the reaction is completed the mixture in the kettle is cooled and centrifuged. The centrifuged material is ready for use direct, or where desired it can be further treated by clay, steam stripping, etc., thus removing any odors due to any dissolved gases that might be retained.

As another example: Sperm oil and P₂S₅ in similar amounts are subjected to reaction.

As another example: Similar amounts of beeswax and P₂S₅ are reacted in manufacturing procedure as above.

Likewise, the other convenient waxes such as lanolin, wool grease, spermaceti, whale oil, etc., may be applied.

The reaction product, mixed with a mineral oil of lubricating viscosity, is particularly advantageous for internal combustion engines. Thus, a lubricant made up of S. A. E. 20 Mid-Continent oil and 0.5 per cent of a reaction product of degras and P₂S₅, and which initially shows a viscosity of 350 S. U. at 100, sludge 0, 0.05 maximum acid number, and 60.0 optical density, in being run for a standard test period of twenty hours in a test engine of Delco type Ethyl gasoline knock motor Series 30 (at 1200 R. P. M., 212° F. jacket temperature, 300° F. sump temperature) at the conclusion of the run had a viscosity increase of only 105, sludge 0.6, and acid number 0.63. In contrast, the S. A. E. Mid-Continent oil without the degras reaction product, subjected to a similar test run showed a viscosity increase 430, sludge 8.0, and acid number 4.20, and corrosion loss on the copper-lead bearing 135.0 mg. (The corrosion loss in the corresponding run with the degras reaction product was 4.5 mg.) The comparison of lacquer formation also is of particular interest. With the S. A. E. Mid-Continent oil alone, the lacquer formation on the piston skirt was 150.0 mg., and the piston rating appearance was 10, while with the degras reaction product lubricant the lacquer formation for the same running conditions was 6.0 mg., and the piston rating appearance 3.

As indicating the effect on film strength of lubricating oil, some illustrative results of tests on the Cornell and Timken machines are as follows:

| Grade of oil | S. A. E. 20 Mid-Continent. | Same | Same | S. A. E. 20 Penn. |
|---|---|---|---|---|
| Percent of the reaction product. | None | 0.5% degras reaction product. | 1.0% sperm oil reaction product. | 1% beeswax reaction product. |
| Cornel test | 1,200 pounds. | 4,000 pounds. | 4,000 pounds. | 4,000 pounds. |
| Timken test | 15 pounds at 800 R. P. M. | 30 pounds at 800 R. P. M. | 30 pounds at 800 R. P. M. | |

As seen, these lubricants result in a cleaner engine, reducing the amount of sludge in oil, and provide better lubrication by maintaining the viscosity near the originally chosen character. They minimize corrosion, and very critically lessen lacquer formation on pistons, thereby preventing sticking and over-loading and over-heating.

Other modes of applying the principle of the invention may be employed, change being made as regards the details described, provided the features stated in any of the following claims, or the equivalent of such, be employed.

We therefore particularly point out and distinctly claim as our invention:

1. A process of forming a lubricant which comprises reacting constituents consisting of an ester wax and a phosphorus sulfide at a temperature of at least about 275° F., the amount of said phosphorus sulfide being at least the theoretical amount to complete the reaction that occurs with said wax at said temperature, and separating the reaction product from oxides of phosphorus formed during the reaction.

2. A process of forming a lubricant which comprises reacting constituents consisting of an ester wax and phosphorus pentasulfide at a temperature of at least about 275° F., the amount of the phosphorus pentasulfide being at least the theoretical amount to complete the reaction that occurs with said wax at said temperature, and separating the reaction product from oxides of phosphorus formed during the reaction.

3. A process of forming a lubricant which comprises reacting constituents consisting of degras and phosphorus pentasulfide at a temperature of at least about 275° F., the amount of the phosphorus pentasulfide being at least the theoretical amount to complete the reaction that occurs with the degras at said temperature, and separating the reaction product from oxides of phosphorus formed during the reaction.

4. A process of forming a lubricant which comprises reacting constituents consisting of sperm oil and phosphorus pentasulfide at a temperature of at least about 275° F., the amount of the phosphorus pentasulfide being at least the theoretical amount to complete the reaction that occurs with the sperm oil at said temperature, and separating the reaction product from oxides of phosphorus formed during the reaction.

5. A process of forming a lubricant which comprises reacting constituents consisting of beeswax and phosphorus pentasulfide at a temperature of at least about 275° F., the amount of the phosphorus pentasulfide being at least the theoretical amount to complete the reaction that occurs with the beeswax at said temperature, and separating the reaction product from oxides of phosphorus formed during the reaction.

6. A process of preparing a lubricant which comprises reacting constituents consisting of an ester wax and a phosphorus sulfide at a temperature of at least about 275° F., the amount of said phosphorus sulfide being at least the theoretical amount to complete the reaction that occurs with said wax at said temperature, separating the reaction product from oxides of phosphorus formed during the reaction, and mixing 0.01% to 100% of said reaction product with a mineral lubricating oil.

7. A process of preparing a lubricant which comprises reacting constituents consisting of an ester wax and phosphorus pentasulfide at a temperature of at least about 275° F., the amount of the phosphorus pentasulfide being at least the theoretical amount to complete the reaction that occurs with said wax at said temperature, separating the reaction product from oxides of phosphorus formed during the reaction, and mixing 0.01% to 100% of said reaction product with a mineral lubricating oil.

8. A process of preparing a lubricant which comprises reacting constituents consisting of degras and phosphorus pentasulfide at a temperature of at least about 275° F., the amount of the phosphorus pentasulfide being at least the theoretical amount to complete the reaction that occurs with the degras at said temperature, separating the reaction product from oxides of phosphorus formed during the reaction, and mixing 0.01% to 100% of said reaction with a mineral lubricating oil.

9. A process of preparing a lubricant which comprises reacting constituents consisting of sperm oil and phosphorus pentasulfide at a temperature of at least about 275° F., the amount of the phosphorus pentasulfide being at least the theoretical amount to complete the reaction that occurs with the sperm oil at said temperature, separating the reaction product from oxides of phosphorus formed during the reaction, and mixing 0.01% to 100% of said reaction product with a mineral lubricating oil.

10. A process of preparing a lubricant which comprises reacting constituents consisting of beeswax and phosphorus pentasulfide at a temperature of at least about 275° F., the amount of the phosphorus pentasulfide being at least the theoretical amount to complete the reaction that occurs with the beeswax at said temperature, separating the reaction product from oxides of phosphorus formed during the reaction, and mixing 0.01% to 100% of said reaction product with a mineral lubricating oil.

11. A lubricant comprising the reaction product consisting of an ester wax reacted with at least the theoretical amount of a phosphorus sulfide to complete the reaction that occurs at a temperature of at least about 275° F., said wax and said sulfide being reacted at said temperature to form said reaction product which is separated from a phosphorus oxide containing sludge.

12. A lubricant comprising the reaction product consisting of an ester wax reacted with at least the theoretical amount of phosphorus pentasulfide to complete the reaction that occurs at a temperature of at least about 275° F., said wax and said phosphorus pentasulfide being reacted at said temperature to form said reaction product which is separated from a phosphorus oxide containing sludge.

13. A lubricant comprising the reaction product consisting of degras reacted with at least the theoretical amount of phosphorus pentasulfide to complete the reaction that occurs at a temperature of at least about 275° F., said degras and said phosphorus pentasulfide being reacted at said temperature to form said reaction product which is separated from a phosphorus oxide containing sludge.

14. A lubricant comprising the reaction product consisting of sperm oil reacted with at least the theoretical amount of phosphorus pentasulfide to complete the reaction that occurs at a temperature of at least about 275° F., said sperm oil and said phosphorus pentasulfide being reacted at said temperature to form said reaction product which is separated from a phosphorus oxide containing sludge.

15. A lubricant comprising the reaction product consisting of beeswax reacted with at least the theoretical amount of phosphorus pentasulfide to complete the reaction that occurs at a temperature of at least about 275° F., said beeswax and said phosphorus pentasulfide being reacted at said temperature to form said reaction product which is separated from a phosphorus oxide containing sludge.

16. A lubricant comprising a mineral lubricating oil in admixture with 0.01% to 100% of the reaction product consisting of an ester wax reacted with at least the theoretical amount of a phosphorus sulfide to complete the reaction that occurs at a temperature of at least about 275° F., said wax and said sulfide being reacted at said temperature to form said reaction product which is separated from a phosphorus oxide containing sludge.

17. A lubricant comprising a mineral lubricating oil in admixture with 0.01% to 100% of the reaction product consisting of an ester wax reacted with at least the theoretical amount of phosphorus pentasulfide to complete the reaction that occurs at a temperature of at least about 275° F., said wax and said phosphorus pentasulfide being reacted at said temperature to form said reaction product which is separated from a phosphorus oxide containing sludge.

18. A lubricant comprising a mineral lubricating oil in admixture with 0.01% to 100% of the reaction product consisting of degras reacted with at least the theoretical amount of phosphorus pentasulfide to complete the reaction that occurs at a temperature of at least about 275° F., said degras and said phosphorus pentasulfide being reacted at said temperature to form said reaction product which is separated from a phosphorus oxide containing sludge.

19. A lubricant comprising a mineral lubricating oil in admixture with 0.01% to 100% of the reaction product consisting of sperm oil reacted with at least the theoretical amount of phosphorus pentasulfide to complete the reaction that occurs at a temperature of at least about 275° F., said sperm oil and said phosphorus pentasulfide being reacted at said temperature to form said reaction product which is separated from a phosphorus oxide containing sludge.

20. A lubricant comprising a mineral lubricating oil in admixture with 0.01% to 100% of the reaction product consisting of beeswax reacted with at least the theoretical amount of phosphorus pentasulfide to complete the reaction that occurs at a temperature of at least about 275° F., said beeswax and said phosphorus pentasulfide being reacted at said temperature to form said reaction product which is separated from a phosphorus oxide containing sludge.

JOHN M. MUSSELMAN.
HERMAN P. LANKELMA.

CERTIFICATE OF CORRECTION.

Patent No. 2,357,346.                                              September 5, 1944.

JOHN M. MUSSELMAN, ET AL.

It is hereby certified that error appears in the printed specification of the above numbered patent requiring correction as follows: Page 2, first column, line 9, for "minerol" read --mineral--; and second column, line 70, claim 8, after the word "reaction" insert --product--; and that the said Letters Patent should be read with this correction therein that the same may conform to the record of the case in the Patent Office.

Signed and sealed this 31st day of October, A. D. 1944.

Leslie Frazer (Seal)                                           Acting Commissioner of Patents.